US011623283B2

(12) United States Patent
Kotarac

(10) Patent No.: US 11,623,283 B2
(45) Date of Patent: Apr. 11, 2023

(54) TURNING INSERT FOR METAL CUTTING

(71) Applicant: SANDVIK INTELLECTUAL PROPERTY AB, Sandviken (SE)

(72) Inventor: Sacha Kotarac, Vadstena (SE)

(73) Assignee: Sandvik Intellectual Property AB, Sandviken (SE)

(*) Notice: Subject to any disclaimer, the term of this patent is extended or adjusted under 35 U.S.C. 154(b) by 495 days.

(21) Appl. No.: 16/622,515

(22) PCT Filed: Dec. 19, 2017

(86) PCT No.: PCT/EP2017/083509
§ 371 (c)(1),
(2) Date: Dec. 13, 2019

(87) PCT Pub. No.: WO2018/233861
PCT Pub. Date: Dec. 27, 2018

(65) Prior Publication Data

US 2020/0206823 A1 Jul. 2, 2020

(30) Foreign Application Priority Data

Jun. 19, 2017 (EP) .................................... 17176544

(51) Int. Cl.

| | |
|---|---|
| ***B23B 27/04*** | (2006.01) |
| ***B23B 27/16*** | (2006.01) |
| *B23B 27/14* | (2006.01) |
| *B23B 29/04* | (2006.01) |

(52) U.S. Cl.
CPC ............ *B23B 27/045* (2013.01); *B23B 27/16* (2013.01); *B23B 27/145* (2013.01); *B23B 29/043* (2013.01); *B23B 2200/201* (2013.01); *B23B 2205/12* (2013.01); *B23B 2226/125* (2013.01)

(58) Field of Classification Search
CPC .......... B23B 2200/28; B23B 2200/204; B23B 2200/208; B23B 2200/201; B23B 2200/202; B23B 27/1625; B23B 27/005; B23B 27/04; B23B 27/1611; B23B 27/164; B23B 27/141; B23B 27/145; B23B 27/045; B23B 2220/12; B23B 2270/54; B23B 29/043; B23B 1/00; Y10T 407/25
See application file for complete search history.

(56) References Cited

U.S. PATENT DOCUMENTS 5,246,315 A 3/1993 Hansson et al.
5,342,151 A * 8/1994 Friedmann ............ B23B 27/045 407/116
7,275,896 B2 * 10/2007 Nudelman ............ B23B 29/043 407/115

(Continued)

FOREIGN PATENT DOCUMENTS

CN 1053902 A 8/1991
CN 101663116 A 3/2010

(Continued)

*Primary Examiner* — Sara Addisu
(74) *Attorney, Agent, or Firm* — Corinne R. Gorski

(57) ABSTRACT

A turning insert includes a head portion connected to a stem portion. A CBN cutting edge includes a surface generating cutting edge and two major cutting edge portions, such that each major cutting edge portion forms an angle of 5-20° in relation to a tangent line of the cutting edge at a forward point of the cutting edge.

13 Claims, 8 Drawing Sheets

(56) References Cited

U.S. PATENT DOCUMENTS

| | | | | |
|---|---|---|---|---|
| 9,205,495 | B2 * | 12/2015 | Fujii | B23B 27/045 |
| 2006/0039763 | A1 | 2/2006 | Lof et al. | |
| 2010/0119314 | A1 * | 5/2010 | Nagaya | B23B 27/04<br>408/1 R |
| 2010/0175519 | A1 | 7/2010 | Deschenaux et al. | |
| 2012/0051854 | A1 | 3/2012 | Pretorius | |
| 2016/0175942 | A1 | 6/2016 | Sevdic et al. | |

FOREIGN PATENT DOCUMENTS

| | | | | | |
|---|---|---|---|---|---|
| CN | 102271844 | A | | 12/2011 | |
| CN | 102458730 | A | | 5/2012 | |
| CN | 104384540 | A | | 3/2015 | |
| DE | 2518395 | A1 | | 10/1976 | |
| EP | 1595625 | A2 | | 11/2005 | |
| JP | S59232702 | A | * | 12/1984 | B23B 57/145 |
| JP | H10113802 | A | | 5/1998 | |
| JP | 2005324324 | A | * | 11/2005 | B23B 27/141 |
| KR | 20080089213 | A | * | 10/2008 | B23B 27/02 |

* cited by examiner 1
11
A1
8
9
2
A
A
10
46
4
5
48
47
29
12
7

I
6
8
B9
45
9
10
3
5
2
31
7

45
4
5

B6
B7
50
49
51
2
47
46
48
8
4
5
6

50
49
51
B6
3

TURNING INSERT FOR METAL CUTTING

RELATED APPLICATION DATA

This application is a § 371 National Stage Application of PCT International Application No. PCT/EP2017/083509 filed Dec. 19, 2017 claiming priority to EP 17176544.9 filed Jun. 19, 2017.

TECHNICAL FIELD OF THE INVENTION

The present invention belongs to the technical field of metal cutting. More specifically the present invention belongs to the field of turning inserts, or cutting inserts for turning, in particular longitudinal turning, where the turning insert comprises a cutting edge made from cubic boron nitride (CBN). Such turning inserts are preferably used in machine tools such as CNC-lathes when machining work pieces, such as work pieces made from hardened steel.

BACKGROUND OF THE INVENTION AND PRIOR ART

The present invention refers to a turning insert for longitudinal external turning of hardened steel, comprising a top surface, an opposite bottom surface, a first side surface, an opposite second side surface, a front surface, and an opposite rear surface. The top and bottom surfaces are connected by the first side surface, the second side surface, the front surface and the rear surface. A longitudinal axis intersecting the front and rear sur-faces. The longitudinal axis extending mid-way between the first and second side surfaces. The turning insert comprises a cutting edge comprising cubic boron nitride (CBN). The cutting edge is at least partly formed at an intersection between the top surface and the front surface. The cutting edge comprises a forward point intersecting the longitudinal axis in a top view. A tangent line of the cutting edge at the forward point extend in a top view perpendicular to the longitudi-nal axis. The turning insert is symmetrical or substantially symmet-rical in a top view in relation to the longitudinal axis.

A known turning insert is disclosed in EP1595625A2, which is manufactured based on cubic boron nitride (CBN). Said known insert is suitable for external longitudinal turning. Said turning insert is detachably mountable in an insert seat of a tool body, or a tool, which is mountable to a machine tool. During machining, the work piece rotates around a center axis thereof, while the tool body, and thereby the turning insert, is moved relative to the work piece. The relative movement is also known as feed, or cutting feed. During longitudinal turning, the feed direction is linear and parallel to said rotational axis. During machining, material is removed from the workpiece in the form of chips. The turning insert comprises a cutting edge, which cuts the chips, thereby generating a machined surface.

Elongated turning inserts comprising a CBN cutting edge exists, and are used for radial grooving. However, there exists a prejudice among skilled persons to use such inserts for external longitudinal turning of at least hardened steels.

SUMMARY OF THE INVENTION

It has been found that a turning insert comprising a CBN cutting edge, for use in longitudinal turning of especially hardened steel having a hardness of above 55 HRc according to the Rockwell scale, can be further improved. Such an improved turning insert has been found to generate a smooth machined surface, i.e. improved surface finish, have low insert wear, and shall be versatile in use, e.g. by allowing possibility for longitudinal turning in opposite directions.

The objects of the present invention are to provide improved turning insert for longitudinal turning, comprising a CBN cutting edge, which can generate a smooth machined surface, i.e. improved surface finish, have low insert wear, and shall be versatile in use, e.g. by allowing possibility for longitudinal turning in opposite directions.

At least one or some of the above objects is achieved by the turning insert as described above, which further comprises a head portion connected to a stem portion, wherein a greatest width of the head portion is greater than a greatest width of the stem portion, where said widths are measured perpendicular to the longitudinal axis, in that the head portion comprises the cutting edge, the head portion comprises a land portion adjacent to the cutting edge, in that the cutting edge comprises a surface generating cutting edge comprising the forward point, in that in a top view the surface generating cutting edge being straight or convexly curved at a radius of curvature greater than 50 mm, in that the cutting edge comprising two major cutting edge portions located on opposite sides of the surface generating cutting edge, each major cutting edge portion extending between an axially forward point and an axially rearward point, wherein a distance from each axially forward point to the longitudinal axis is shorter than a distance from each axially rearward point to the longitudinal axis, and in that each major cutting edge portion forming an angle of 5-20° in relation to the tangent line of the cutting edge at the forward point.

The inventor has found that test results show improved surface finish in longitudinal turning compared to an insert which is substantially according to EP1595625. With a turning insert according to an embodiment of the invention, the surface roughness values achieved from longitudinal turning of hardened steel having a hardness of 48-60 HRc can be as low as 0.14 μm, according to the profile roughness parameter $R_a$, and as low as 0.80 μm, according to the profile roughness parameter $R_z$, at cutting speed 120 m/min, feed rate 0.50 mm/rev.

By such a turning insert, longitudinal turning, i.e. turning in a direction parallel to the rotation axis of the work piece, can be made using the same insert in opposite directions. By such a turning insert, improved machined surface finish can be achieved. By such a turning insert, insert wear can be low. Such a turning insert is especially suitable for turning hardened steel having a hardness of 50-70 HRc, preferably 55-70 HRc (hardness according to the Rockwell scale). Such steels include carbon and alloys steels, hardness 50-60 HRc, and die steels, hardness 55-65 HRc. Specific examples of steels include (SAE/AISI standard): 5120 steel (62 HRc), 1050 steel (62 HRc), 9310 (60 HRc) and 4320 steel (60-62 HRc).

Such a turning insert may alternatively be used for turning of nickel-based super alloys and/or precipitation-hardenable nickel-chromium alloy such as e.g. Inconel 718. Such a turning insert may alternatively be used for turning of cast iron. Such a turning insert may have improved accessibility as a result of the relatively narrower stem portion and/or as a result of the arrangement of the two major cutting edge portions. Such a turning insert give low insert wear in longitudinal turning at relatively small cutting depth, at least partly because the insert shape give an entering angle in longitudinal turning that is relatively low.

The turning insert is detachably mountable in an insert seat of a tool body. Said tool body is preferably made from a less wear resistant material than the turning insert, such as preferably steel. The turning insert is suitable for longitudinal external turning, i.e. where the feed direction during cutting is parallel to the rotational axis of the work piece.

The turning insert comprises a top surface, comprising a rake face and preferably one or more seating surfaces, and opposite bottom surface, which preferably comprises one or more seating surfaces.

The turning insert comprises a first side surface, facing a longitudinal feed direction during use, and an opposite second side surface. The turning insert comprises a front or forward surface which during cutting is facing the work piece, and an opposite rear surface which preferable comprises a seating surface or a contact surface, i.e. a surface which is in contact with an insert seat of the tool body in which the turning insert is mounted or mountable.

A longitudinal axis, or an axis of symmetry, intersects the front and rear surfaces, and extends mid-way between the first and second side surfaces. The longitudinal axis is during cutting perpendicular to the rotational axis of the work piece to be machined.

The turning insert comprises a cutting edge comprising cubic boron nitride (CBN), also called PCBN, polycrystalline cubic boron nitride. Preferably, the turning insert comprises a tip which is permanently connected, e.g. by brazing, to a pocket or recess. The tip preferably comprises 40-95% of cubic boron nitride (CBN). Preferably, the volume of the tip is 1-50% of the total volume of the turning insert. Preferably, the turning insert comprises 50-99% volume of cemented carbide. Preferably, said tip comprises said cutting edge.

The cutting edge is at least partly formed at, or at least partly extend along, an intersection or border line between the top surface and the front surface. The cutting edge preferably extend along an intersection between the top surface and the first and second side surfaces, respectively. The cutting edge is preferably continuous or uninterrupted. The cutting edge preferably is smooth in a top view, i.e. without sharp corners or sharp transitions. The cutting edge may preferably be in a singular plane. Alternatively, the cutting edge may have a height, seen in a side view or in a front view, which varies.

The cutting edge comprises a forward point intersecting the longitudinal axis in a top view. No point of the turning insert is more distant or most spaced apart from the rear surface, in a top view, than the forward point.

A tangent line of the cutting edge, in a top view, at the forward point extend in a top view perpendicular to the longitudinal axis.

The turning insert is symmetrical or substantially symmetrical in a top view in relation to the longitudinal axis. In other words, the turning insert is symmetric about a vertical plane which intersects the front and rear surfaces, and which plane comprises the longitudinal axis.

The turning insert comprises a head portion, or a front portion, permanently connected to a stem portion, or a rear portion, alternatively an intermediate portion, wherein a greatest width of the head portion is greater than a greatest width of the stem portion where said widths are measured perpendicular to the longitudinal axis in a top view. The greatest width of the head portion is preferably 2.4-12.0 mm, even more preferably 2.5-8.0 mm. The greatest width of the head portion is preferably defined by the greatest width of the cutting edge.

Preferably, the width of the stem portion is constant or substantially constant. Preferably, the width of the stem portion, or the distance from the first side surface to the second side surface, is constant along the stem portion. Preferably, the width of the stem portion is constant from the top surface to the bottom surface. Preferably the width of the head portion is increasing from the bottom surface towards the top surface.

Preferably the length of the stem portion, as measured along or parallel to the longitudinal axis, is greater than the length of the head portion. Even more preferably, said length of the stem portion is 150-800% of said length of the head portion. Even more preferably, said length of the stem portion is 200-600% of said length of the head portion. The head portion comprises the front surface. The stem portion may comprise the rear surface. Alternatively, the turning insert may comprise a second opposite head portion, wherein said second head portion comprises the rear surface, and wherein the stem portion is between the head portions.

The head portion comprises the cutting edge and a land portion, or a negative land, or a cutting edge reinforcement land, adjacent to the cutting edge.

The cutting edge comprising a surface generating cutting edge, or a surface wiping cutting edge portion, or a cutting edge portion, comprising the forward point. The surface generating cutting edge is the portion of the cutting edge which cuts and/or wipes the machined surface. In a top view the surface generating cutting edge is straight, and perpendicular to the longitudinal axis. Alternatively, and preferably, the surface generating cutting edge is convexly curved at a preferably constant, alternatively variably, radius of curvature which is greater than 20 mm, preferably greater than 40 mm. By arranging the turning insert such that the surface generating cutting edge is non-linear and has a radius of curvature, the machined surface finish is improved even in case of angular displacement of the turning insert, i.e. in case that the longitudinal axis of the turning insert is not exactly perpendicular to the rotational axis of the work piece.

The cutting edge further comprises two major cutting edge portions located on opposite sides of the surface generating cutting edge. The major cutting edges may be straight or substantially straight in a top view. The major cutting edges may comprise a portion, which is above 70% of the length of the major cutting edge, which is straight in a top view. Alternatively, the major cutting edges may be convexly curved in a top view. One of the major cutting edge portions is the portion of the cutting edge which in longitudinal turning removes the majority of the material, preferably over 75% of the material, at a cutting depth of 0.10 mm. Alternatively, the major cutting edges may have a shape of a segment of an ellipse in a top view, where the radius of curvature of the major cutting edges decreases away from the longitudinal axis of the turning insert.

Each major cutting edge portion extend between an axially forward point and an axially rearward point.

Forward and rearward is in a top view, in relation to the rear surface. The forward point is further away from the rear surface.

A distance from each axially forward point to the longitudinal axis is shorter than a distance from each axially rearward point to the longitudinal axis. Each axially forward point is spaced apart from the longitudinal axis in a top view.

Each major cutting edge portion forms an angle of 5-20°, preferably 7-11°, in relation to the tangent line of the cutting edge at the forward point. If each major cutting edge portion is convexly curved in a top view, the axially forward point of the major cutting edge is defined as the point of the cutting edge where in top view a tangent line of said point forms the lower limit of said angle in relation to the tangent line of the cutting edge at the forward point. In a corresponding manner, the axially rearward point of the major cutting edge is defined as the point of the cutting edge where in top view a tangent line of said point forms the upper limit of said angle in relation to the tangent line of the cutting edge at the forward point.

According to an embodiment, each major cutting edge portion extends 0.05-0.20 mm in the longitudinal direction.

By such a turning insert, cutting at a cutting depth of 0.10 mm or approximately 0.10 mm can efficiently be made, using a relatively narrow turning insert.

Each major cutting edge portion extend 0.05-0.20 mm, preferably 0.07-0.15 mm, in the longitudinal direction. In other words, a distance measured between the axially forward and rearward points in the longitudinal direction, defined by the longitudinal axis, is 0.05-0.20 mm, preferably 0.07-0.15 mm.

According to an embodiment, each major cutting edge, in a direction perpendicular to the longitudinal axis, extends 8-25% of the greatest width of the head portion.

By such a turning insert, the turning insert can be made relatively narrow and/or can have an optimal balance of surface finish and/or insert wear and/or cutting depth.

Each major cutting edge, in a direction perpendicular to the longitudinal axis, extend 8-25%, preferably 10-20%, of the greatest width of the head portion. In other words, a distance measured between the axially forward and rearward points in a direction perpendicular to the longitudinal direction extend 8-25%, preferably 10-20%, of the greatest width of the head portion.

According to an embodiment, each axially forward point is spaced apart from the forward point of the cutting edge and wherein a distance between the axially rearward points is smaller than the greatest width of the head portion.

By such a turning insert, the turning insert can be arranged for radial grooving, e.g. by arranging corner cutting edges adjacent to the axially rearward points of the major cutting edge portions, and further away from the longitudinal axis.

Each axially forward point is spaced apart from the forward point of the cutting edge. A distance between the axially rearward points is smaller than the greatest width of the head portion. Preferably a distance between the axially rearward points is 70-95% of the greatest width of the head portion.

According to an embodiment, the greatest width of the head portion is 105-175% of the greatest width of the stem portion, wherein the top surface and/or the bottom surface comprises seating means extending along or parallel to the longitudinal axis.

By such a turning insert, the inventor has found that the clamping of the insert in an insert seat is optimal.

The greatest width of the head portion, preferably defined by the greatest width of the cutting edge, is 105-175%, preferably 125-160%, of the greatest width of the stem portion. The width of the stem portion is preferably constant or substantially constant. Said widths are measured perpendicular to the longitudinal axis. In other words, said widths are measured as the distance between the first and second side surfaces.

The top surface, preferably the top surface of the stem portion, and/or the bottom surface comprises seating means. Preferably, both the top surface and the bottom surface comprise seating means. Said seating means preferably extends along or parallel to the longitudinal axis. Said seating means are arranged to improve clamping of the turning insert in an insert seat, and to improve the stability and/or reduce the movement of the turning insert during use.

Said seating means are preferably in the form of one or more groove and/or one or more ridge.

The top surface seating means preferably comprise a central top groove, extending between a first seating surface and a second seating surface.

The bottom surface seating means preferably comprise a central bottom groove extending between a third seating surface and a fourth seating surface.

According to an embodiment, the cutting edge comprises corner cutting edges, wherein each corner cutting edge is adjacent to the respective axially rearward point of the respective major cutting edge portion, wherein in a top view the corner cutting edges are convexly curved having radii of curvature, wherein the radii of curvature of the corner cutting edges are smaller than the radius of curvature of the surface generating cutting edge.

By such a turning insert, use for radial grooving is improved.

The cutting edge comprises convexly curved corner cutting edges, in a top view. A distance from the corner cutting edges to the longitudinal axis is greater than a distance from the major cutting edge portions to the longitudinal axis. A distance from the corner cutting edges to the tangent line of the cutting edge at the forward point is greater than a distance from the major cutting edge portions to tangent line of the cutting edge at the forward point. In a top view the corner cutting edges are convexly curved having a radius of curvature, which preferably is constant or substantially constant. Alternatively, said curvature may vary, e.g. gradually vary such that the radius of curvature is decreasing at increasing distance from the longitudinal axis. In either case, the radii of curvature of the corner cutting edges are smaller than the radius of curvature of the surface generating cutting edge. The surface generating cutting edge may be straight in top view, in which case the radius of curvature of the surface generating cutting edge is infinite. The radii of curvature of the corner cutting edges may preferably by constant or substantially constant, preferably 0.10-1.00 mm, even more preferably 0.15-0.60 mm.

According to an embodiment, the radius of curvature of the surface generating cutting edge is greater than 60 mm, wherein the length of the surface generating cutting edge, measured perpendicular to the longitudinal axis, is 20-65% of the greatest width of the head portion.

By arranging the turning insert, the machined surface finish is improved even in case of angular displacement of the turning insert, i.e. in case that the longitudinal axis of the turning insert is not exactly perpendicular to the rotational axis of the work piece.

The radius of curvature of the surface generating cutting edge in a top view is greater than 60 mm, and preferably less than 200 mm. The length of the surface generating cutting edge, measured perpendicular to the longitudinal axis, is 20-65%, preferably 25-60%, of the greatest width of the head portion.

According to an embodiment, the land portion has a width, measured in top view perpendicular to the cutting edge, which is 0.05-0.20 mm.

By such a turning insert, the insert wear is further reduced.

The land portion has a width, measured in top view perpendicular to the cutting edge, which is 0.05-0.20 mm, preferably 0.07-0.15 mm. The land portion is in the form of a negative chamfer. Preferably the negative chamfer has an angle of 10-40°, even more preferably 20-30°.

Preferably the cutting edge has an edge roundness of 10-50 μm.

According to an embodiment, a distance from the front surface to the rear surface is 200-1000% of the greatest width of the head portion.

By such a turning insert, accessibility is further improved. By such a turning insert, the range of use for the turning insert is increased.

A distance from the front surface to the rear surface, along the longitudinal axis, is 200-1000%, preferably 400-700%, of the greatest width of the head portion. Said distance from the front surface to the rear surface is preferably 20-50 mm. Thus, the turning insert is in top view elongated in the direction of the longitudinal axis. Preferably, the greatest distance between the top and bottom surfaces is greater than the greatest width of the head portion.

According to an embodiment, the cutting edge comprises a front portion, extending between a first point and a second point, which in top view is shaped as or substantially as a half ellipse comprising a major axis and a semi-minor axis, where the major axis of the half ellipse extends perpendicular to the longitudinal axis and intersecting the corner cutting edges, wherein the semi-minor axis intersects the forward point.

By such a turning insert, where the portion of the cutting edge which is active in longitudinal turning is elliptic in a top view, or more exactly is shaped as a half ellipse in a top view, the turning insert may be useable over a greater range of cutting depths.

The cutting edge comprises a front or forward portion, adjacent to the front surface, and extending between a first point, bordering the first side surface, and an opposite second point, bordering the second side surface.

The front portion is in top view shaped as or substantially as a half ellipse comprising a relatively longer major axis, intersecting said first and second points, and a relatively shorter semi-minor axis, where the major axis of the half ellipse extend perpendicular to the longitudinal axis and intersecting the corner cutting edges, wherein the semi-minor axis extend between the forward point and the major axis.

Each of the first and second major cutting edge portions forms an angle of 5-20° in relation to the tangent line. Said angles varies between 5 and 20°, such that said angles gradually increases away from the longitudinal axis.

Each major cutting edge portion extend between an axially forward point, where a tangent line of the cutting edge in a top view forms an angle, which is 5°, in relation to the tangent line, and an axially rearward point, where a tangent line of the cutting edge in a top view forms an angle, which is 20°, in relation to the tangent line.

According to an embodiment, the length of the major axis of the half ellipse is 400-3000% of the length of the semi-minor axis of the half ellipse.

According to an aspect of the invention, a method to machine a work piece comprising the steps of providing a turning insert according to the invention or any embodiment; providing a work piece comprising an external surface; rotating the work piece around a rotational axis; arranging the longitudinal axis of the turning insert perpendicular to the rotational axis of the work piece; and moving the turning insert in a first feed direction parallel to the rotational axis such that the first major cutting edge portion is active.

By such a method, improved machined surface finish can be achieved. By such a method, insert wear can be low.

The method is a turning method, for machining a work piece, which preferably is hardened steel having a hardness of 50-70 HRc, preferably 55-70 HRc, even more preferably 58-62 HRc (hardness according to the Rockwell scale). Such steels includes carbon and alloys steels (50-60 HRc) and die steels (55-65 HRc). Specific examples of steels include (SAE/AISI standard): 5120 steel (62 HRc), 1050 steel (62 HRc), 9310 (60 HRc) and 4320 steel (60-62 HRc). The work piece may alternatively be in the form of a nickel-based super alloys and/or precipitation-hardenable nickel-chromium alloy such as e.g. Inconel 718.

The method preferably includes the step of providing a CNC-lathe.

The external surface of the work piece is preferably rotationally symmetrical or substantially rotationally symmetrical around the rotational axis.

The work piece is preferably releasably clamped to the CNC-lathe by clamping means, preferably by one or more clamping jaws, and preferably by an opposite pin, or spike. The CNC-lathe preferably comprises a motor which causes the clamping jaws to rotate, thereby rotating the work piece around the rotational axis.

The method comprises the step of arranging the longitudinal axis of the turning insert perpendicular to the rotational axis of the work piece during cutting, such that the front surface of the turning insert is facing the external surface of the work piece.

The method includes the step of moving the turning insert in a first feed direction parallel to the rotational axis such that the first major cutting edge portion is active, such that the second major cutting edge portion is inactive, and such that the external surface of the work piece is cut or machined by the turning insert. A machined surface is formed, having a constant or substantially constant diameter.

The method preferably further comprises the step of setting the cutting speed to a constant or substantially constant value.

The method preferably further comprises the step of setting the cutting speed to a 40-180 m/min, even more preferably 60-160 m/min.

The method preferably further comprises the step of setting the feed rate in the first feed direction to a constant or substantially constant value.

The method preferably further comprises the step of setting the feed rate in the first feed direction to 0.3-1.5 mm/rev., even more preferably 0.5-1.0 mm/rev.

The method preferably further comprises the step of setting the cutting depth to 0.03-0.25 mm, even more preferably 0.08-0.18 mm.

The feed rate in longitudinal turning is preferably 25-45% of the length of the surface generating cutting edge, measured as a distance between the first and second end points of the surface generating cutting edge.

The method preferably further comprises the step of setting the coolant to dry machining, i.e. without using liquid coolant to the active cutting edge.

The method preferably further comprises the step of setting a tool overhang, i.e. a distance along the longitudinal axis where the tool is narrower than the insert width, to 5-25 mm, even more preferably 8-12 mm.

The length of the work piece, measured along the rotational axis of the work piece, is preferably 8-500 mm, even more preferably 20-250 mm. The outer diameter of the work piece is preferably 20-400 mm, even more preferably 30-200 mm. Preferably length of the workpiece is 2-20 times, even more preferably 3-8 times, of the outer diameter of the work piece.

The method preferably comprises the step of providing an external opening or groove or recess in the work piece, and the step of radially feed or move the turning insert towards the rotational axis of the work piece such that at least the surface generating cutting edge is inside said external opening, and such that the turning insert is inactive, i.e. is not cutting.

The above step precedes the step which includes moving the turning insert in a first feed direction. In other words, the entry of cut is by moving the turning insert in a first feed direction, parallel to the rotational axis of the work piece. The inventor has found that such entrance, i.e. without plunging, reduces the risk of vibration and therefor improves the machined surface finish.

According to an embodiment, the method further comprises the step of moving the turning insert in a second feed direction, opposite to the first feed direction, such that the second major cutting edge portion is active.

By such a method, longitudinal turning, i.e. turning in a direction parallel to the rotation axis of the work piece, can be made using the same insert in opposite directions. By such a method, the insert wear are distributed over partly different portions of the cutting edge, thereby increasing the tool life of the insert.

The method thus comprises the further step of moving the turning insert in a second feed direction, opposite to the first feed direction, such that the second major cutting edge portion is active, i.e. cuts material from the work piece.

During the further step, the longitudinal axis of the turning insert is perpendicular to the rotational axis of the work piece.

The external surface to be cut when moving the insert in the second feed direction is defined or substantially defined by the machined surface resulting from the cutting in the prior cutting in the first feed direction. In other words, the diameter of the machined surface from the second feed direction cutting is smaller than the diameter of the machined surface from the first feed direction cutting.

During the further machining step, the cutting speed, feed rate and cutting depth is within the same ranges as described for the cutting in the first feed direction.

According to an embodiment, the method comprises the further step of arranging the work piece such that the external surface comprises hardened steel having a hardness of 50-70 HRc.

A further embodiment relates to a computer program having instructions which when executed by a computerized numerical control lathe cause the computerized numerical control lathe to perform the method according to an aspect of the invention or according to an embodiment.

The computer program may be stored on a computer readable medium. A data stream may be representative of the computer program. The computer has instructions which when executed by a computerized numerical control (CNC) lathe cause the computerized numerical control (CNC) lathe to perform the machining method.

DESCRIPTION OF THE DRAWINGS

The present invention will now be explained in more detail by a description of different embodiments of the invention and by reference to the accompanying drawings.

DETAILED DESCRIPTION OF EMBODIMENTS OF THE INVENTION

Figures 1, 2, 3, 4:
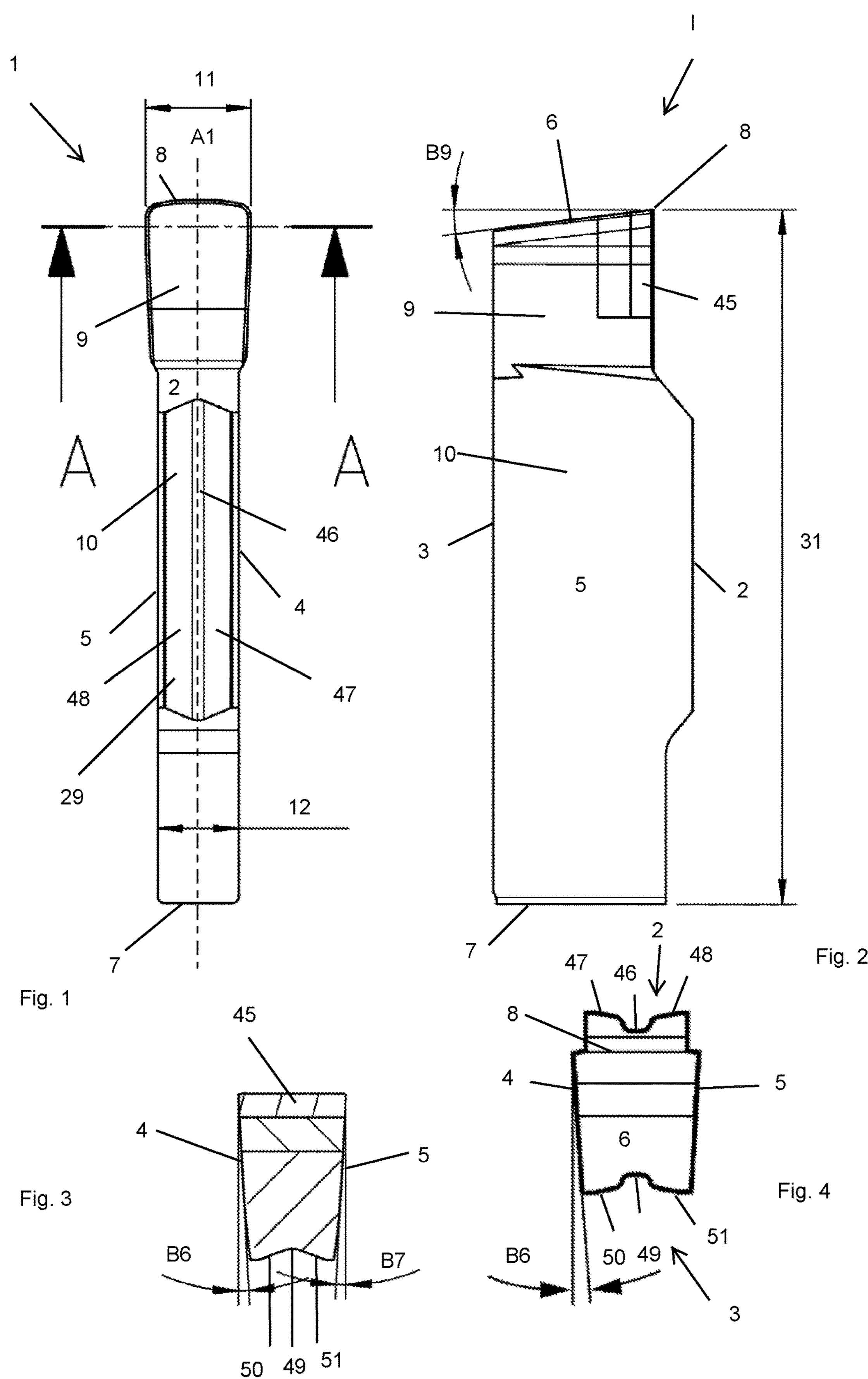
FIG. 1 is a top view showing a turning insert according to a first embodiment.
FIG. 2 is a side view of the turning insert in FIG. 1.
FIG. 3 is a partial cross-sectional view of the turning insert shown in FIG. 1, taken along the line A-A in FIG. 1.
FIG. 4 is a front view of a turning insert according to a second embodiment.

Reference is made to FIGS. 1-3 and 5-6 showing a turning insert according to a first embodiment. The turning insert comprises a top surface 2, an opposite bottom surface 3, a first side surface 4, an opposite second side surface 5, a front surface 6 and an opposite rear surface 7. The top and bottom surfaces 2, 3 are connected by the first side surface 4, the second side surface 5, the front surface 6, and the rear surface 7. A longitudinal axis A1 is intersecting the front and rear surfaces 6, 7. The longitudinal axis A1 is extending mid-way between the first and second side surfaces 4, 5. The turning insert 1 comprises a cutting edge 8 comprising cubic boron nitride (CBN). A portion of the cutting edge 8 is formed at an intersection between the top surface 2 and the front surface 6. The cutting edge 8 comprises a forward point 13 intersecting the longitudinal axis A1 in a top view. A tangent line L1 of the cutting edge 8 at the forward point 13 extend in a top view perpendicular to the longitudinal axis A1. The turning insert 1 is symmetrical or substantially symmetrical in a top view in relation to the longitudinal axis. The turning insert 1 comprises a head portion 9 connected to a stem portion 10.

A greatest width 11 of the head portion 9 is greater than a greatest width 12 of the stem portion 10. Said widths 11, 12 are measured perpendicular to the longitudinal axis A1.

As seen in FIG. 1, the width 12 of the stem portion 10 is constant or substantially constant.

The head portion 9 comprises the cutting edge 8.

As will be explained more in detail when referring to FIG. 10, the head portion 9 comprises a land portion 28 adjacent to the cutting edge 8.

The cutting edge 8 comprises a surface generating cutting edge 14 comprising the forward point 13.

Figure 5:
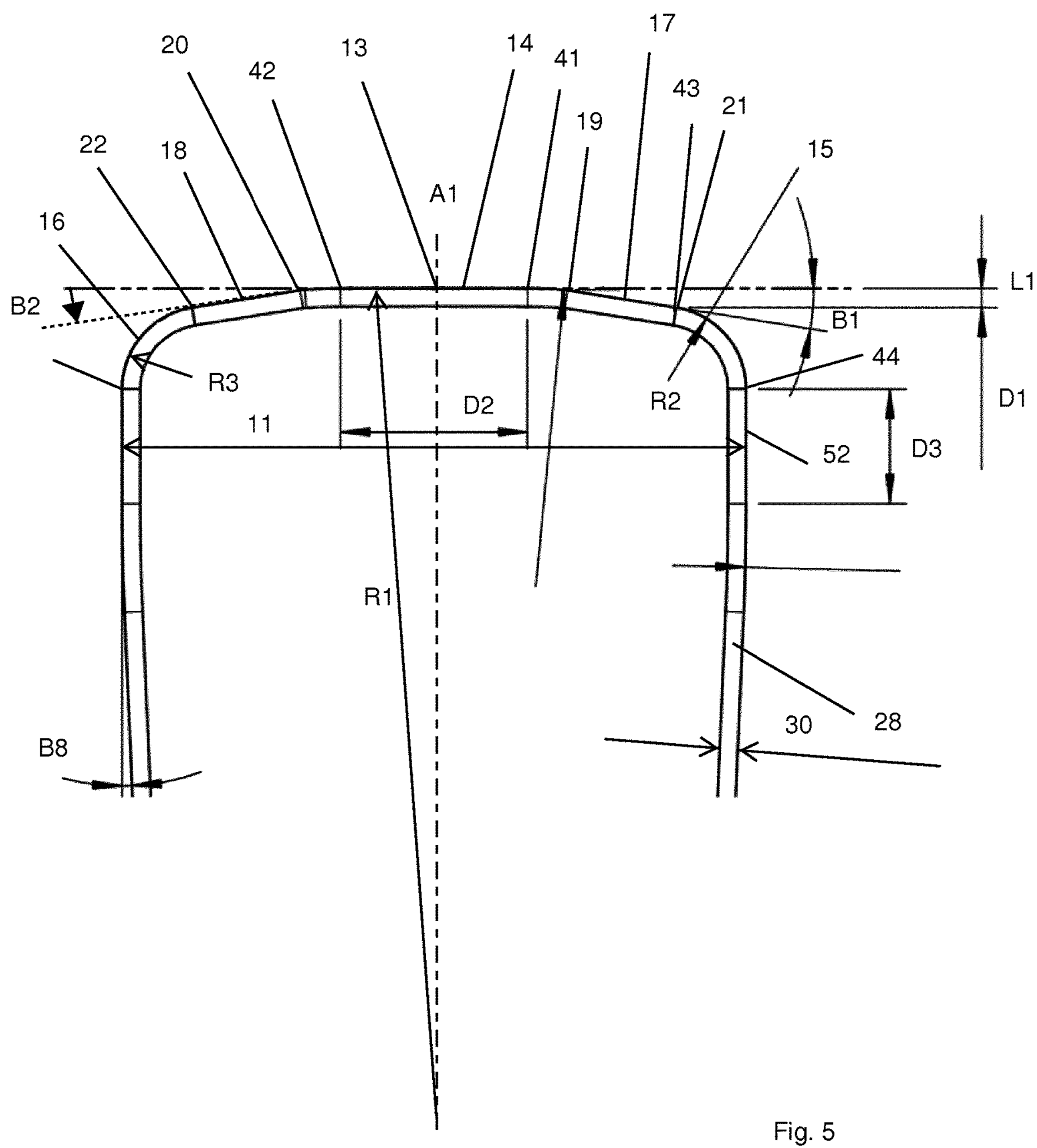
FIG. 5 is a top view of the head portion of the turning insert in FIG. 1.

In a top view, as seen in FIG. 5, the surface generating cutting edge 14 is convexly curved at a radius of curvature R1 greater than 50 mm, thus substantially straight. Alternatively, the surface generating cutting edge 14 may be straight or substantially straight in a top view.

Figure 6:
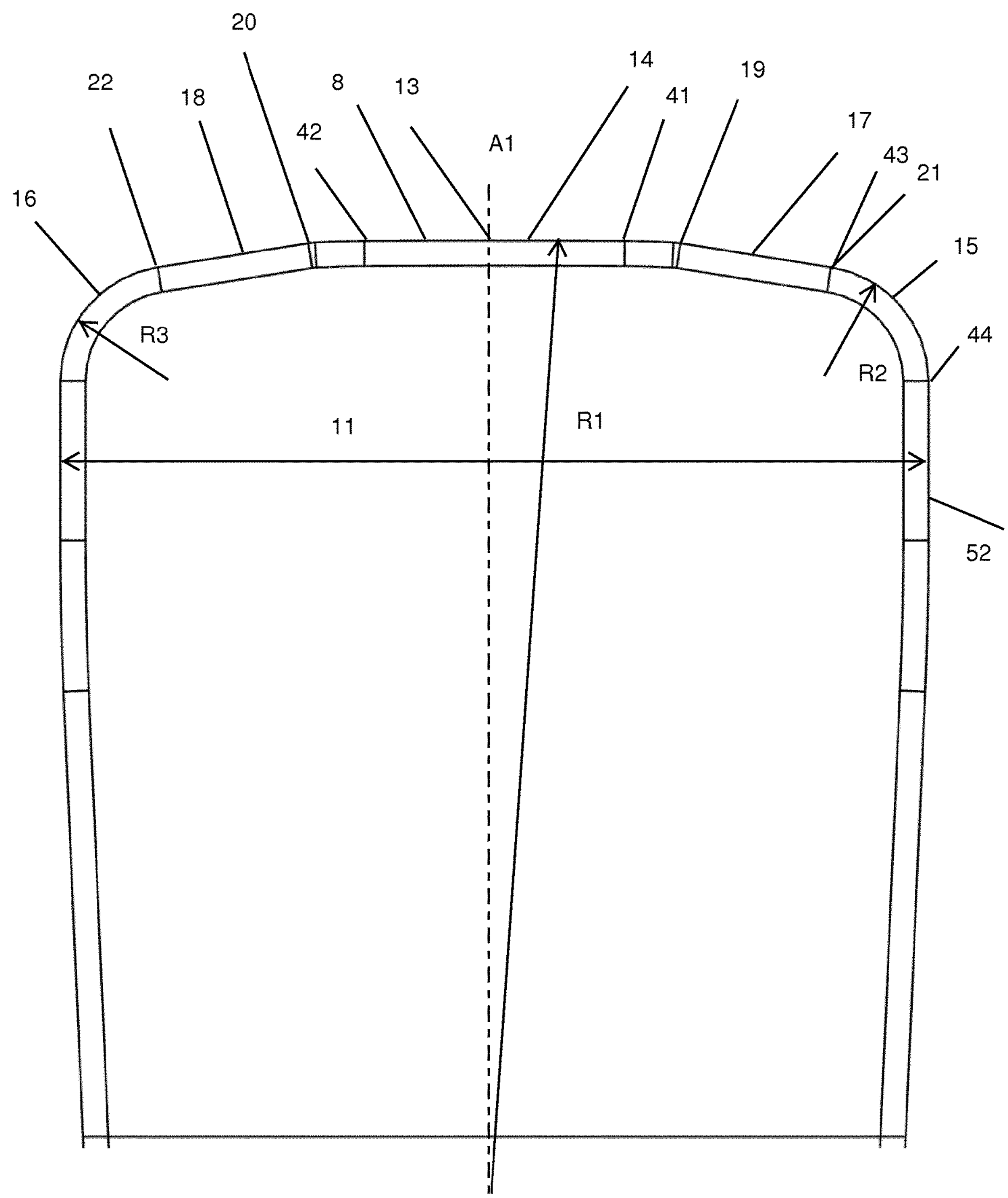
FIG. 6 is a further top view of the head portion of the turning insert in FIG. 1.

As seen in e.g. FIG. 6, the surface generating cutting edge 14 extends between first and second end points 41, 42.

The cutting edge 8 comprises two major cutting edge portions 17, 18 located on opposite sides of the surface generating cutting edge 14, and which according to the first embodiment are straight or substantially straight or are at least partially straight in a top view. Each major cutting edge portion 17, 18 extend between an axially forward point 19, 20 and an axially rearward point 21, 22.

A distance from each axially forward point 19, 20 to the longitudinal axis A1 is shorter than a distance from each axially rearward point 21, 22 to the longitudinal axis A1.

Each major cutting edge portion 17, 18 forms an angle B1, B2 of 5-20°, 7-11® according to the first embodiment, in relation to the tangent line L1 of the cutting edge 8 at the forward point 13. Said angle corresponds to an entering angle in longitudinal turning. Each major cutting edge portion 17, 18 extend 0.05-0.20 mm, preferably 0.07-0.15 mm, in the longitudinal direction defined by the longitudinal axis A1.

Each major cutting edge 17, 18, in a direction perpendicular to the longitudinal axis A1, extend 8-25%, preferably 10-20%, of the greatest width 11 of the head portion 9.

Each axially forward point 19, 20 of the respective major cutting edge portion 17, 18 is spaced apart from the forward point 13 of the cutting edge 8

A distance between the axially rearward points 21, 22 is smaller than the greatest width 11 of the head portion 9.

The greatest width 11 of the head portion 9, preferably defined by the greatest width of the cutting edge 8, is 105-175%, preferably 125-160%, of the greatest width 12 of the stem portion 10.

As seen in e.g. FIGS. 5 and 6, the cutting edge 8 comprises first and second corner cutting edges 15, 16.

The first corner cutting edge 15 extends between a first end point 43 and a second end point 44. The second corner cutting edge 16 is arranged in a corresponding manner.

As seen in FIG. 5, a maximum recommended cutting depth in longitudinal turning is defined as a shortest distance D1 between the axially rearward point 21 of the active major cutting edge portion 17 and the tangent line L1.

As seen in FIG. 5, the cutting edge comprise opposite side cutting edges 52. Each of the side cutting edges 52 have a length, measured parallel to the longitudinal axis A1, which is designated D3, and which preferably is 0.2-1.2 mm, even more preferably 0.4-0.6 mm. The side cutting edges 52 are preferably straight or substantially straight in a top view. Alternatively, the side cutting edges 52 are convexly curved in a top view having a radius of curvature greater than 10 mm, preferably greater than 50 mm.

The greatest width 11 of the head portion 9 is according to the first embodiment defined as the distance between the opposite side cutting edges 52.

Each corner cutting edge 15, 16 is adjacent to the respective axially rearward point 21, 22 of the respective major cutting edge portion 17, 18, and further away from the longitudinal axis A1. During longitudinal turning, the corner cutting edges 15, 16 are preferably inactive. In other words, the cutting depth in longitudinal turning is preferably set sufficiently low, such that a corner cutting edge 15, adjacent to an active major cutting edge portion 17, is inactive.

In a top view the corner cutting edges 15, 16 are convexly curved having a radii of curvature R2, R3, smaller than the radius of curvature R1 of the surface generating cutting edge 14. According to the first embodiment, the radii of curvature of the corner cutting edges are constant or substantially constant, preferably 0.10-1.00 mm, even more preferably 0.15-0.60 mm.

The radius of curvature R1 of the surface generating cutting edge 14 is greater than 60 mm, and preferably less than 200 mm.

The length D2 of the surface generating cutting edge 14, measured perpendicular to the longitudinal axis A1, is 20-65%, preferably 25-60%, of the greatest width 11 of the head portion 9.

As seen in FIG. 1, the turning insert 1 is elongated in a top view in the direction of the longitudinal axis. More specifically, a distance 31, seen in FIG. 2, from the front surface 6 to the rear surface 7 is 200-1000%, preferably 400-700%, of the greatest width 11 of the head portion 9. Said distance 31 from the front surface 6 to the rear surface 7 is preferably 20-50 mm.

As seen in FIG. 2, the greatest distance between the top and bottom surfaces is greater than the greatest width 11 of the head portion 9.

As seen in e.g. FIGS. 5 and 6, the cutting edge 8 is in a top view smooth, i.e. without sharp corner transitions. Rather, transitions between portions of the cutting edge are solely in the form of convexly curved transition portions. Said transition portions between the described portions of the cutting edge 8 are unnumbered in FIGS. 5 and 6 but can be clearly seen.

Figure 10:
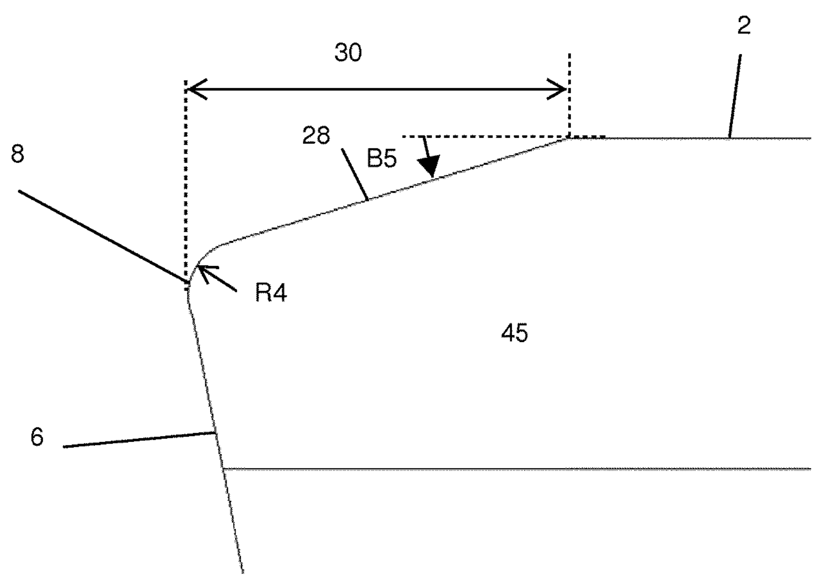
FIG. 10 is a cross section view of the cutting edge of a turning insert according to any of the first-fourth embodiments.

As seen in e.g. FIGS. 3 and 10, the turning insert 1 comprises a tip 45, which comprises 40-95% of cubic boron nitride (CBN). The tip 45 is permanently connected, e.g. by brazing, to a pocket or recess. Preferably, the volume of the tip 45 is 1-50% of the total volume of the turning insert. Preferably, the turning insert 1 comprises 50-99% volume of cemented carbide. Said tip 45 comprises the cutting edge 8.

The tip may be uncoated, or alternatively may be coated with a thin, up top 50 μm, coating from physical vapor deposition (PVD). The coating preferably comprises at least two of the following elements: Titanium, Nitrogen, Carbon, Aluminum and Oxygen.

The land portion 28 adjacent to the cutting edge 8 has a width 30, measured in top view perpendicular to the cutting edge 8, which is 0.05-0.20 mm, preferably 0.07-0.15 mm.

The land portion 28 is in the form of a negative chamfer.

The negative chamfer has an angle B5 of 10-40°, preferably 20-30°.

The cutting edge 8 has an edge roundness R4 of 10-50 μm.

As seen in FIGS. 1 and 3, according to the first embodiment, the top surface 2 and the bottom surface 3 comprises seating means 29 extending along or parallel to the longitudinal axis A1. The top surface 2 seating means, which form part of the stem portion 10, comprise a central top groove 46, extending between a first seating surface 47 and a second seating surface 48. The bottom surface 3 seating means comprise a central bottom groove 49 extending between a third seating surface 50 and a fourth seating surface 51.

In comparison with the top surface 2 seating means, the bottom surface 3 seating means extend a greater distance along the longitudinal axis A1.

As seen in FIG. 2, the top surface 2 seating means are part of a protruding portion, which protruding portion protrudes in a direction away from the bottom surface 2.

As seen in FIG. 2, the front surface 6 forms a front clearance angle B9, preferably 3-15°.

Figure 8:
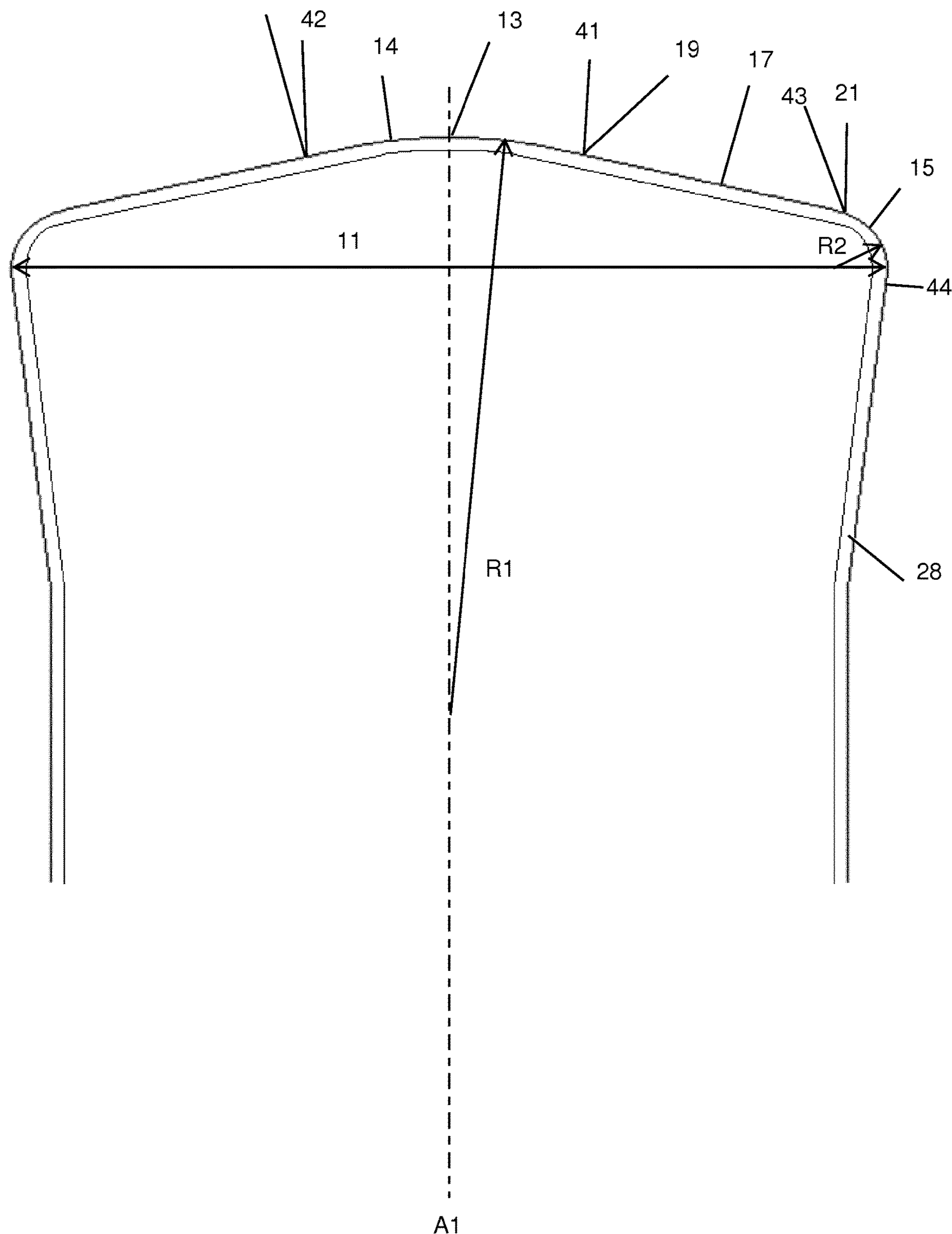
FIG. 8 is a top view of the head portion of a turning insert according to a third embodiment.

As seen in FIG. 8, the cutting edge 8 forms a back-clearance angle B8, preferably 2-10°, in a top view, which makes that turning insert 1 suitable for radial grooving.

As seen in FIG. 3-4, the side surfaces 4, 5 of the head portion 9 forms respective first and second side clearance angles B6, B7, preferably within the range of 1-10°. Consequently, a projected area of the bottom of the head portion 9 is smaller than a projected area of the top of the head portion 9. All embodiments include this feature. The turning insert 1 is a positive insert. The turning insert 1 is a single-sided insert.

Figure 7:
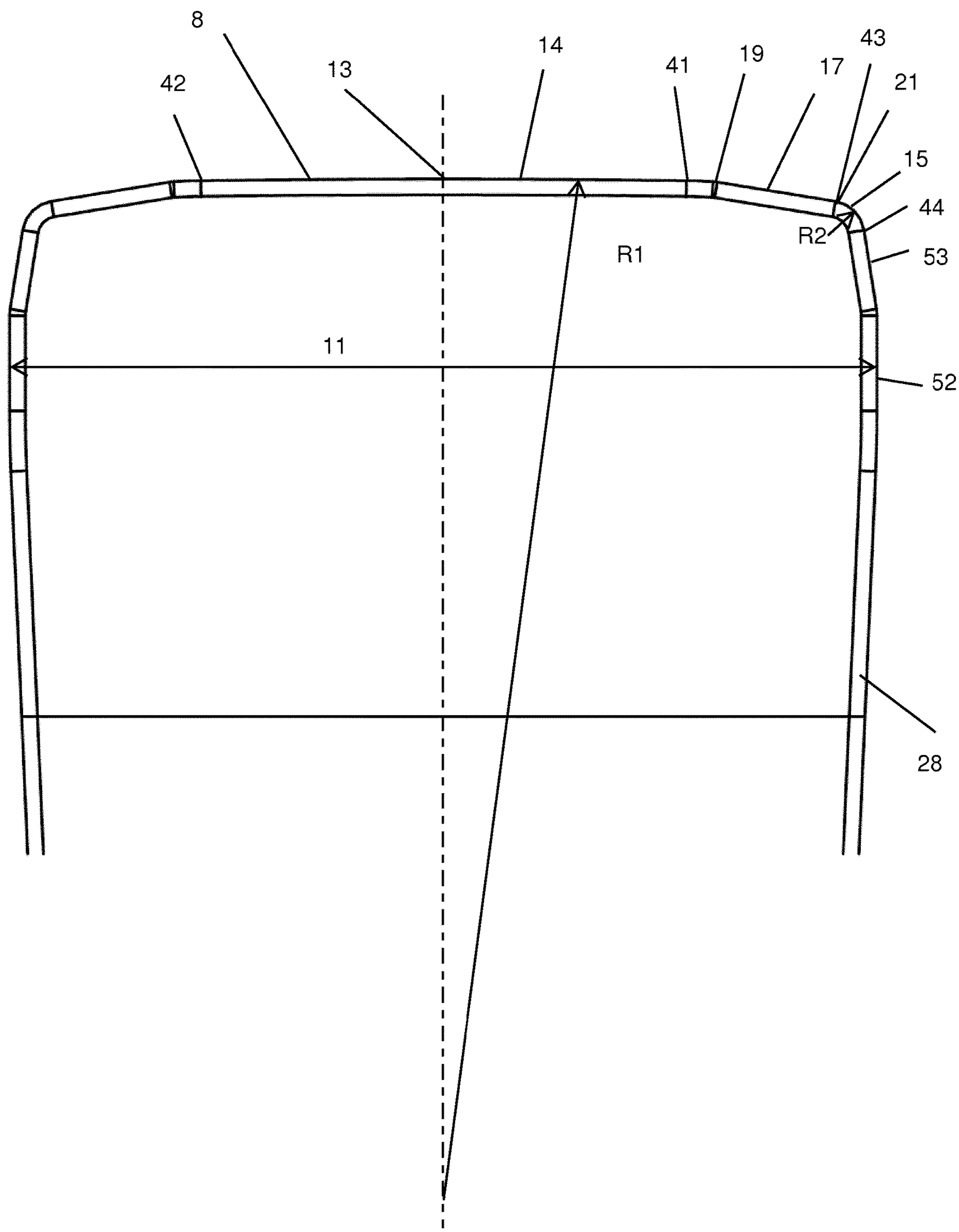
FIG. 7 is a top view of the head portion of the turning insert in FIG. 4.

Attention is now drawn to FIG. 7, showing a top view of a portion of a turning insert 1 according to a second embodiment.

The turning insert 1 according to the second embodiment differs from the turning insert according to the first embodiment in that the cutting edge 8 comprises a secondary cutting edge 53 between the first corner cutting edge 15 and the side cutting edge 52. In a top view, the secondary cutting edge forms an angle 5-20°. The purpose of the secondary cutting edge arrangement is improved tool life and/or surface finish in radial grooving at low, i.e. less than 0.10 mm, cutting depth.

The seating means according to the second embodiment, as seen in FIG. 4, differ to the seating means according to the first embodiment in that the central top and bottom grooves 46, 49 are of a recessed shaped.

In all other substantial aspects, the turning insert 1 according to the second embodiment is substantially similar to the turning insert 1 according to the first embodiment.

Attention is now drawn to FIG. 8, which show a turning insert 1 according to a third embodiment. The turning insert 1 according to a third embodiment differs from the turning insert 1 according to the first and second embodiments in that the turning insert according to the third embodiment lacks convexly curved transition portions, and in that the turning insert 1 lacks secondary cutting edges and side cutting edges. In all other substantial aspects, the turning insert 1 according to the third embodiment is substantially similar to the turning insert 1 according to the first and second embodiments.

Figure 9:
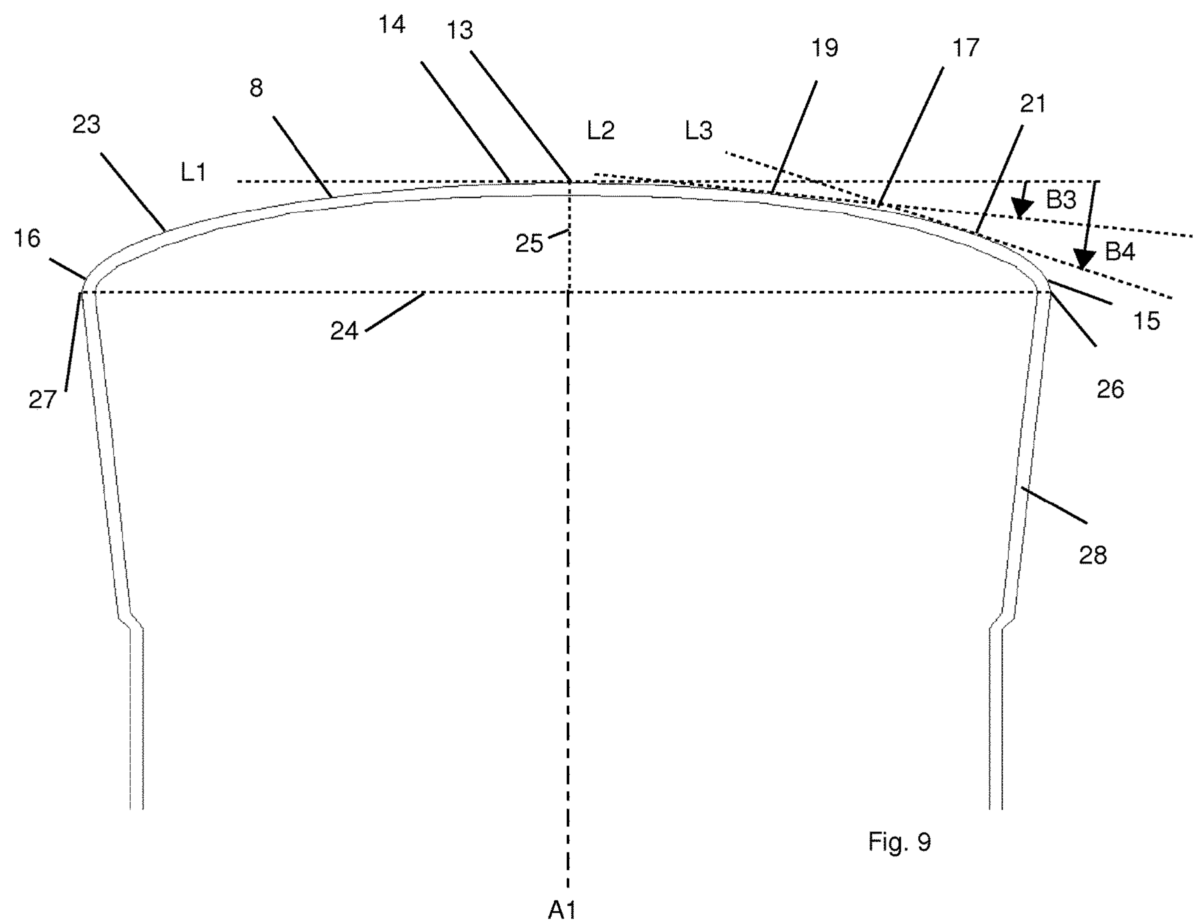
FIG. 9 is a top view of the head portion of a turning insert according to a fourth embodiment.

Attention is now drawn to FIG. 9, which show a turning insert 1 according to a fourth embodiment. The cutting edge 8 comprises a front portion 23 adjacent to the front surface 6 and extending between a first point 26 and a second point 27, which in top view is shaped as or substantially as a half ellipse. Said half ellipse comprises a major axis 24 and a semi-minor axis 25. The major axis 24 of the half ellipse extend perpendicular to the longitudinal axis A1 and intersecting the corner cutting edges 15, 16. The semi-minor axis 25 intersect the forward point 13. The major axis 24 and the semi-minor axis 25 are perpendicular in a top view.

Each of the first and second major cutting edge portions 17, 18 forms an angle B1, B2 of 5-20° in relation to the tangent line L1.

Said angles B1, B2 varies between 5 and 20°, such that said angles gradually increases away from the longitudinal axis.

Each major cutting edge portion 17, 18 extend between an axially forward point 19, 20, where a tangent line L2 of the cutting edge 8 in a top view forms an angle B3, which is 5°, in relation to the tangent line L1, and an axially rearward point 21, 22, where a tangent line L3 of the cutting edge 8 in a top view forms an angle B4, which is 20°, in relation to the tangent line L1. The length of the major axis 24 of the half ellipse is 400-3000% of the length of the semi-minor axis 25 of the half ellipse.

Figure 11:
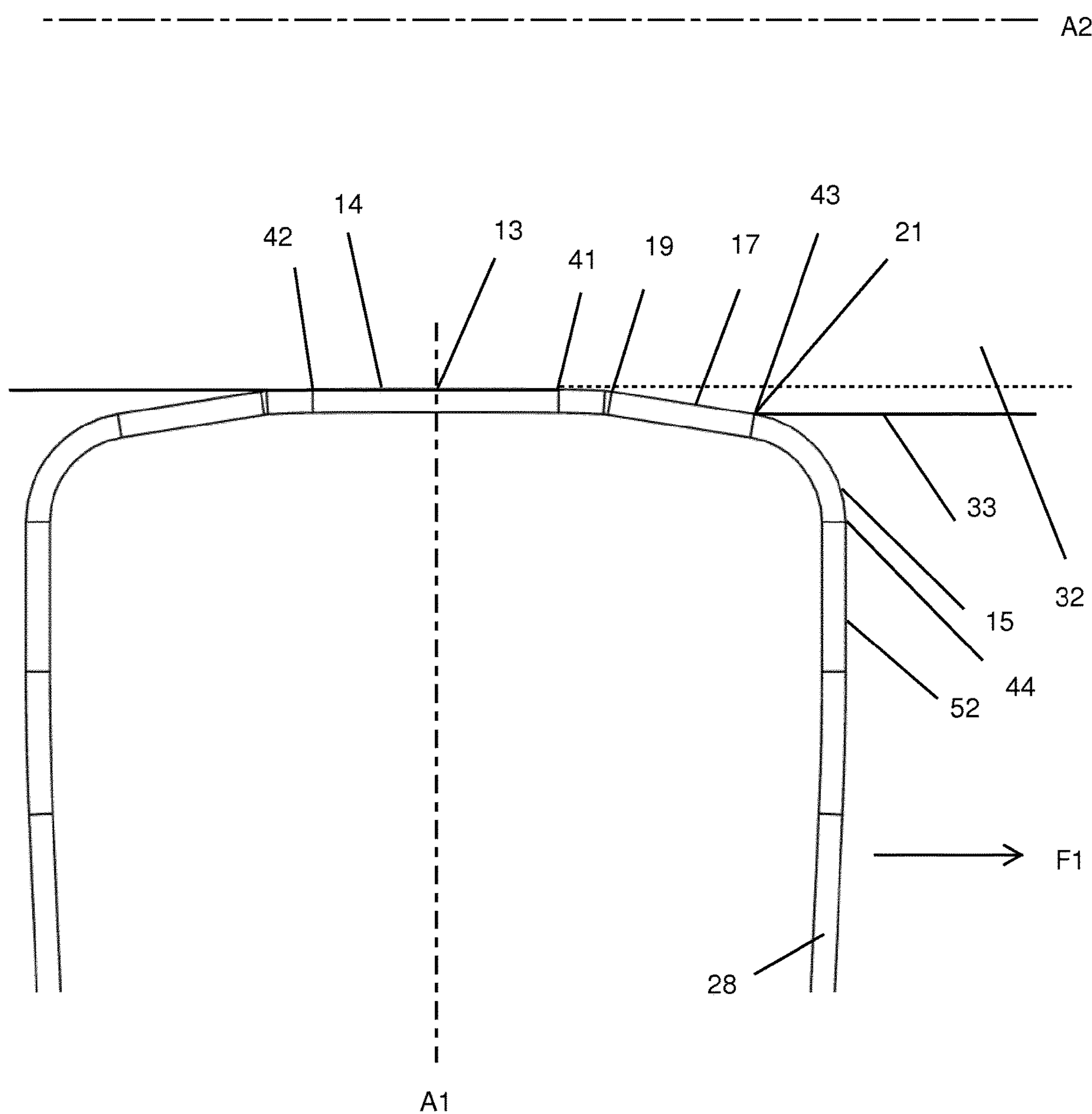
FIG. 11 is a top view of the head portion of the turning insert in FIG. 1 during machining of a work piece.
Figure 12:
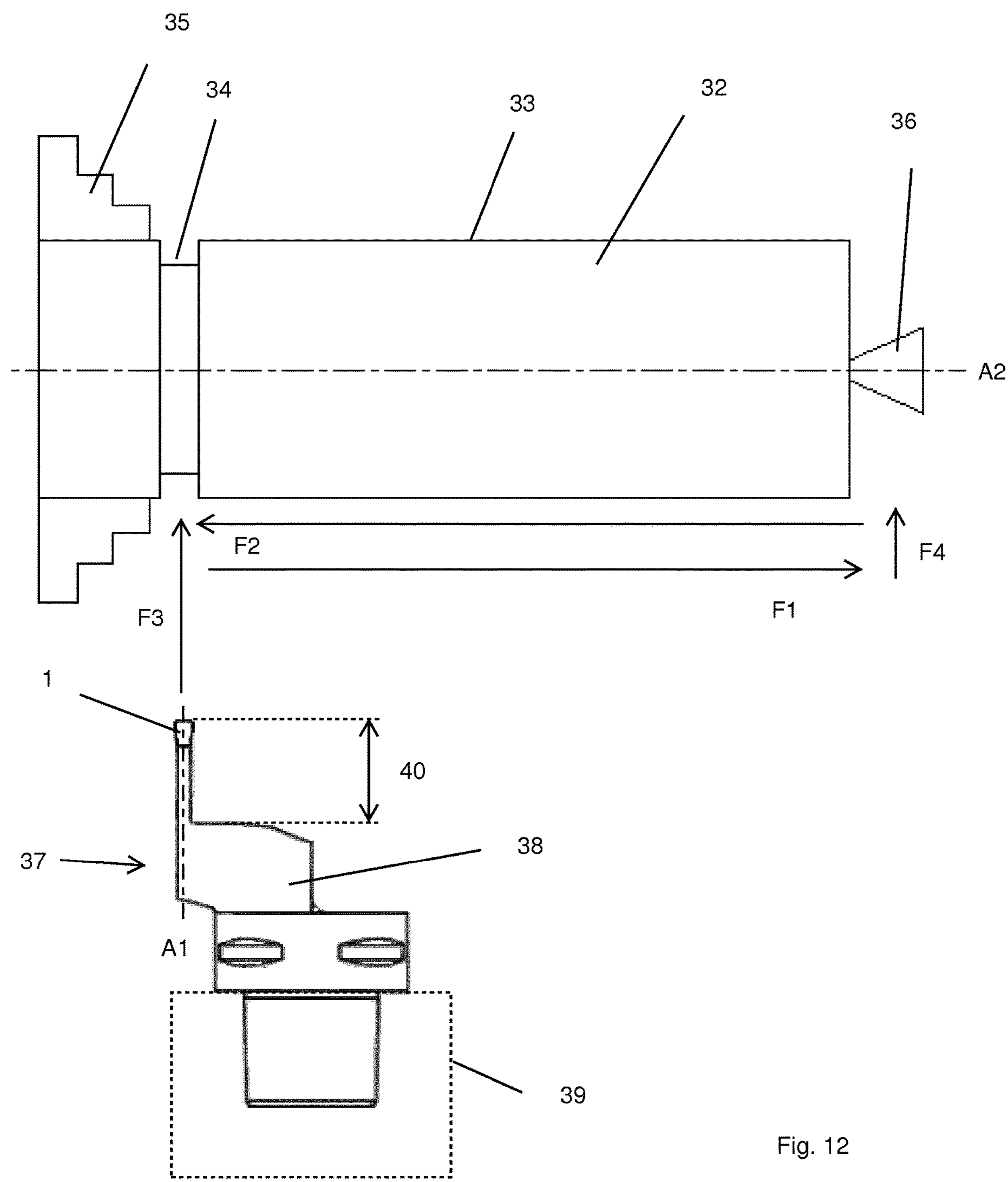
FIG. 12 is a top view of the turning insert according to the first embodiment mounted in an insert seat of a tool body, and a work piece.

Attention is now drawn to FIGS. 11 and 12, which show a method to machine a work piece 32. A turning insert 1 according to the any of the described embodiments is provided, in FIG. 11 the first insert embodiment is shown. A cutting tool 37 comprises the turning insert 1 and a tool body 38 preferably made from steel. The turning insert 1 is mounted in an insert seat or recess formed in the tool body. The insert 1 is clamped by clamping means, which clamping means preferably includes a clamping screw. The tool body 38 is clamped to a machine tool (not shown), such as preferably a CNC-lathe, through a machine interface. A tool overhang 40, i.e. the distance along the longitudinal axis A1 where the tool is narrower than the maximum insert width, is preferably 5-25 mm, even more preferably 8-12 mm.

A work piece 32 is provided, comprising an external surface 33. The external surface 33 of the work piece is preferably rotationally symmetrical or substantially rotationally symmetrical around the rotational axis A2. The work piece 32 in FIG. 12 is substantially cylindrical. The work piece 32 may have other shapes, such as a ring-like shape.

The length of the work piece, measured along the rotational axis of the work piece, is preferably 8-500 mm, even more preferably 20-250 mm. The outer diameter of the work piece is preferably 20-400 mm, even more preferably 30-200 mm. Preferably length of the workpiece is 2-20 times, even more preferably 3-8 times, of the outer diameter of the work piece.

The work piece 32 is hardened steel having a hardness of 50-70 HRc, preferably 55-70 HRc, even more preferably 58-62 HRc (hardness according to the Rockwell scale).

The work piece 32 is releasably clamped to the CNC-lathe by clamping means. In FIG. 12, the clamping means are in the form of clamping jaws 35 and an opposite pin 36, or spike.

The CNC-lathe comprises a motor which causes the clamping jaws 35 to rotate, thereby rotating the work piece 32 around the rotational axis A2.

The movements and/or relative movements of the cutting tool 37 and the work piece are set by a computer program, which control the CNC-lathe.

During the machining method, the work piece 32 is rotated around a rotational axis A2 thereof.

The method comprises the step of arranging the longitudinal axis A1 of the turning insert 1 perpendicular to the rotational axis A2 of the work piece 32 during cutting, such that the front surface of the turning insert 1 is facing the external surface 33 of the work piece 32.

The method in FIG. 12 comprises the step of providing an external opening or groove or recess 34 in the work piece, which external opening 34 opens in the external surface 33.

The method comprises the step of radially feed or move the turning insert 1 towards the rotational axis A2 of the work piece 32 such that at least the surface generating cutting edge 14 is inside said external opening 34, and such that the turning insert is inactive, i.e. is not cutting. Said radial feed in FIG. 12 is designated a first radial feed F3.

The above step precedes a machining step which includes moving the turning insert 1 in a first feed direction F1 parallel to the rotational axis A2 such that the first major cutting edge portion is active, and such that the external surface 33 of the work piece 32 is cut or machined by the turning insert 1, thereby forming a machined surface having a constant or substantially constant diameter, best seen in FIG. 11.

The method comprises a step of moving the cutting tool 37 towards the rotational axis A2 by a second radial feed F4.

The method further comprising the step of moving the turning insert in a second feed direction F2, opposite to the first feed direction D1, such that the second major cutting edge portion is active, i.e. cuts material from the work piece 32, thereby forming a machined surface.

During the further step, the longitudinal axis A1 of the turning insert 1 is perpendicular to the rotational axis A2 of the work piece 32.

The cutting date for cutting in the first and second feed directions F1 and F2 are similar. More precisely, the cutting speed, feed rate and cutting depth is within the same ranges.

The cutting speed is preferably 40-180 m/min, even more preferably 60-160 m/min.

The feed rate is preferably 0.3-1.5 mm/rev., even more preferably 0.5-1.0 mm/rev.

The cutting depth when machining in each of the first and second feed directions F1, F2 is 0.03-0.25 mm, even more preferably 0.08-0.18 mm.

The method preferably further comprises the step of setting the coolant to dry machining, i.e. without using liquid coolant to the active cutting edge.

The expression "a top view" is according to the view in e.g. FIG. 1. The insert drawings as seen in FIGS. 1-7 have been drawn to scale.

The invention claimed is:

1. A turning insert for longitudinal external turning of hardened steel, comprising:

a top surface, an opposite bottom surface, a first side surface, an opposite second side surface, a front surface, and an opposite rear surface, wherein the top and bottom surfaces are connected by the first side surface, the second side surface, the front surface, and the rear surface;

a longitudinal axis intersecting the front and rear surfaces, the longitudinal axis extending mid-way between the first and second side surfaces;

a cutting edge comprising cubic boron nitride, the cutting edge being at least partly formed at an intersection between the top surface and the front surface, the cutting edge including a forward point intersecting the longitudinal axis in a top view, a tangent line of the cutting edge at the forward point extending in a top view perpendicular to the longitudinal axis, the turning insert being symmetrical or substantially symmetrical in a top view in relation to the longitudinal axis; and a head portion connected to a stem portion, wherein a greatest width of the head portion is greater than a greatest width of the stem portion, where said widths are measured perpendicular to the longitudinal axis, the head portion including the cutting edge and a land portion adjacent to the cutting edge, the cutting edge having a surface generating cutting edge including the forward point, wherein in a top view the surface generating cutting edge is convexly curved at a radius of curvature greater than 60 mm and less than 200 mm, and wherein a length of the surface generating cutting edge, measured perpendicular to the longitudinal axis, is 20-65% of the greatest width of the head portion, the cutting edge including two major cutting edge portions located on opposite sides of the surface generating cutting edge, each major cutting edge portion extending between an axially forward point and an axially rearward point, wherein a distance from each axially forward point to the longitudinal axis is shorter than a distance from each axially rearward point to the longitudinal axis, each major cutting edge portion forming an angle of 5-20° in relation to the tangent line of the cutting edge at the forward point, and wherein each major cutting edge portion extends 0.05-0.20 mm in the longitudinal direction.

2. The turning insert according to claim 1, wherein each major cutting edge, in a direction perpendicular to the longitudinal axis, extends 8-25% of the greatest width of the head portion.

3. The turning insert according to claim 1, wherein each axially forward point is spaced apart from the forward point of the cutting edge and wherein a distance between the axially rearward points is smaller than the greatest width of the head portion.

4. The turning insert according to claim 1, wherein the greatest width of the head portion is 105-175% of the greatest width of the stem portion, and wherein the top surface and/or the bottom surface includes seating means extending along or parallel to the longitudinal axis.

5. The turning insert according to claim 1, wherein the cutting edge includes corner cutting edges, each corner cutting edge being adjacent to a respective axially rearward point of a respective major cutting edge portion, wherein in a top view, the corner cutting edges are convexly curved having a radii of curvature, the radii of curvature of the corner cutting edges being smaller than the radius of curvature of the surface generating cutting edge.

6. The turning insert according to claim 1, wherein the land portion has a width, measured in top view perpendicular to the cutting edge, which is 0.05-0.20 mm.

7. The turning insert according to claim 1, wherein a distance from the front surface to the rear surface is 200-1000% of the greatest width of the head portion.

8. The turning insert according to claim 1, wherein the cutting edge includes a front portion extending between a first point-and a second point, which in top view is shaped as or substantially as a half ellipse having a major axis and a semi-minor axis, where the major axis of the half ellipse extends perpendicular to the longitudinal axis and intersecting the corner cutting edges, wherein the semi-minor axis intersect the forward point.

9. The turning insert according to claim 8, wherein the length of the major axis of the half ellipse is 400-3000% of the length of the semi-minor axis of the half ellipse.

10. A method to machine a work piece comprising the steps of:

providing a turning insert according to claim 1;

providing a work piece having an external surface;

rotating the work piece around a rotational axis;

arranging the longitudinal axis of the turning insert perpendicular to the rotational axis of the work piece; and moving the turning insert in a first feed direction parallel to the rotational axis such that the first major cutting edge portion is active.

11. The method according to claim 10, further comprising the step of moving the turning insert in a second feed direction, opposite to the first feed direction, such that the second major cutting edge portion is active.

12. The method according to claim 10, further comprising the step of arranging the work piece such that the external surface comprises hardened steel having a hardness of 50-70 HRc.

13. A computer program having instructions, which when executed by a computerized numerical control lathe, cause the computerized numerical control lathe to perform the method according to claim 10.

* * * * *